(12) United States Patent
Forrest

(10) Patent No.: US 11,697,950 B1
(45) Date of Patent: Jul. 11, 2023

(54) UTILITIES CONNECTION MANAGEMENT SYSTEM AND METHOD FOR RETRACTABLE BUILDINGS

(71) Applicant: HIBER TECHNOLOGIES LLC, Newport Beach, CA (US)

(72) Inventor: Gregory Holden Forrest, Indio, CA (US)

(73) Assignee: HIBER TECHNOLOGIES LLC, Newport Beach, CA (US)

( * ) Notice: Subject to any disclaimer, the term of this patent is extended or adjusted under 35 U.S.C. 154(b) by 0 days.

(21) Appl. No.: 17/982,733

(22) Filed: Nov. 8, 2022

(51) Int. Cl.
*E04H 9/14* (2006.01)

(52) U.S. Cl.
CPC ..................... *E04H 9/14* (2013.01)

(58) Field of Classification Search
CPC ........................................................ E04H 9/14
USPC ........................................................ 52/169.1
See application file for complete search history.

(56) References Cited

U.S. PATENT DOCUMENTS

| | | | |
|---|---|---|---|
| 5,974,743 A * | 11/1999 | Vaia | E04H 9/14 52/169.1 |
| 6,338,596 B1 * | 1/2002 | Galeazzi | B65F 1/1457 588/900 |
| 10,730,729 B1 * | 8/2020 | Cui | E04G 1/34 |
| 10,988,922 B2 * | 4/2021 | Borden | E04B 1/34336 |
| 2009/0053024 A1 * | 2/2009 | Myers | E04H 6/06 414/229 |
| 2009/0260925 A1 * | 10/2009 | Schilling | B66F 7/0666 187/269 |
| 2021/0180357 A1 * | 6/2021 | Borden | E04B 1/34336 |
| 2021/0189741 A1 * | 6/2021 | Forrest | E04H 9/14 |

* cited by examiner

*Primary Examiner* — Brian E Glessner
*Assistant Examiner* — James J Buckle, Jr.
(74) *Attorney, Agent, or Firm* — Cohen IP Law Group, PC; Michael N. Cohen

(57) ABSTRACT

A system and method for managing one or more utility connections and utility lines (electrical, water, sewer, data, etc.) associated with a retractable building that may generally translate from a predominantly above grade position to a predominantly below grade position, and back again, is provided. The system includes a cable carrier with a fixed end configured with a first manifold bracket to receive the utility lines from the utility providers, and a movable end configured with a second manifold bracket to connect the utility lines to the building. During use, as the building is lowered underground, the system provides continual and uninterrupted utility connections between the utility providers and the building.

18 Claims, 13 Drawing Sheets

UTILITIES CONNECTION MANAGEMENT SYSTEM AND METHOD FOR RETRACTABLE BUILDINGS

FIELD OF THE INVENTION

This invention relates to utility connection systems, including a utility connection system for retractable buildings.

BACKGROUND

The catastrophic destruction caused by wildfires, tornados, and hurricanes to residential homes and other types of building structures has become a worldwide crisis. In just the last decade, wildfires in California alone have resulted in over 170,000 homes destroyed, over 1,000 dead, and over $120 billion in cash losses.

A recently developed solution for this includes a retractable building system whereby a building in danger of a wildfire (or destructive winds) may be lowered into an underground chamber for protection. However, utility connections, such as electrical, water, sewage, and data lines, extending to the home from utility providers would be severed and/or severely damaged if not managed properly during the translation of the building.

Accordingly, there is a need for a system and method that manages the utility connections configured with a retractable building.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF EXEMPLARY EMBODIMENTS

As used herein, unless used otherwise, the following terms and abbreviations have the following meanings.

The term "building structure" will refer to any type of physical building structure including (without limitation), residential buildings, commercial buildings, homes, condominiums, apartment buildings, single-unit buildings, multi-unit buildings, educational buildings, institutional buildings, assembly buildings, business buildings, mercantile buildings, industrial buildings, storage buildings, wholesale establishments, mixed land use buildings, hazardous buildings, detached buildings, semi-detached buildings, multi-story or high-rise buildings, slums, unsafe buildings, special buildings, single-level car parking, multi-level car parking, other types of buildings and any combination thereof. Building structures also may include structures such as antennas, towers, bridges, overpasses, industrial pipes, telephone lines/poles, power lines/poles, communication lines/poles, utility lines/poles, traffic signals, other types of structures and any combination thereof. It is understood that a building structure may include a single building structure or multiple building structures.

It also is understood that while this specification may describe the system primarily in relation to its use with residential homes, the system may be applied to any types of building structures and the scope of the system is not limited in any way by the types of building structures that it may be applied to.

In general, the system according to exemplary embodiments hereof provides a system and method for connecting, configuring, moving, repositioning, protecting, and generally managing one or more utility connections and lines (electrical, water, sewer, data, etc.) associated with a retractable building that may generally translate from a predominantly above grade position to a predominantly below grade position, and back again. The retractable building may include any building structure configured with a building structure translation system such as the building structure translation system disclosed in U.S. Pat. No. 11,274,456, filed Sep. 3, 2020, the entire contents of which are hereby fully incorporated herein by reference for all purposes. For example, the system may manage the utilities of a single-family retractable home as it translates from an above grade position to a below grade position for protection from wildfires, tornados, hurricanes, acts of war, and/or other types of harmful circumstances.

Figure 1:
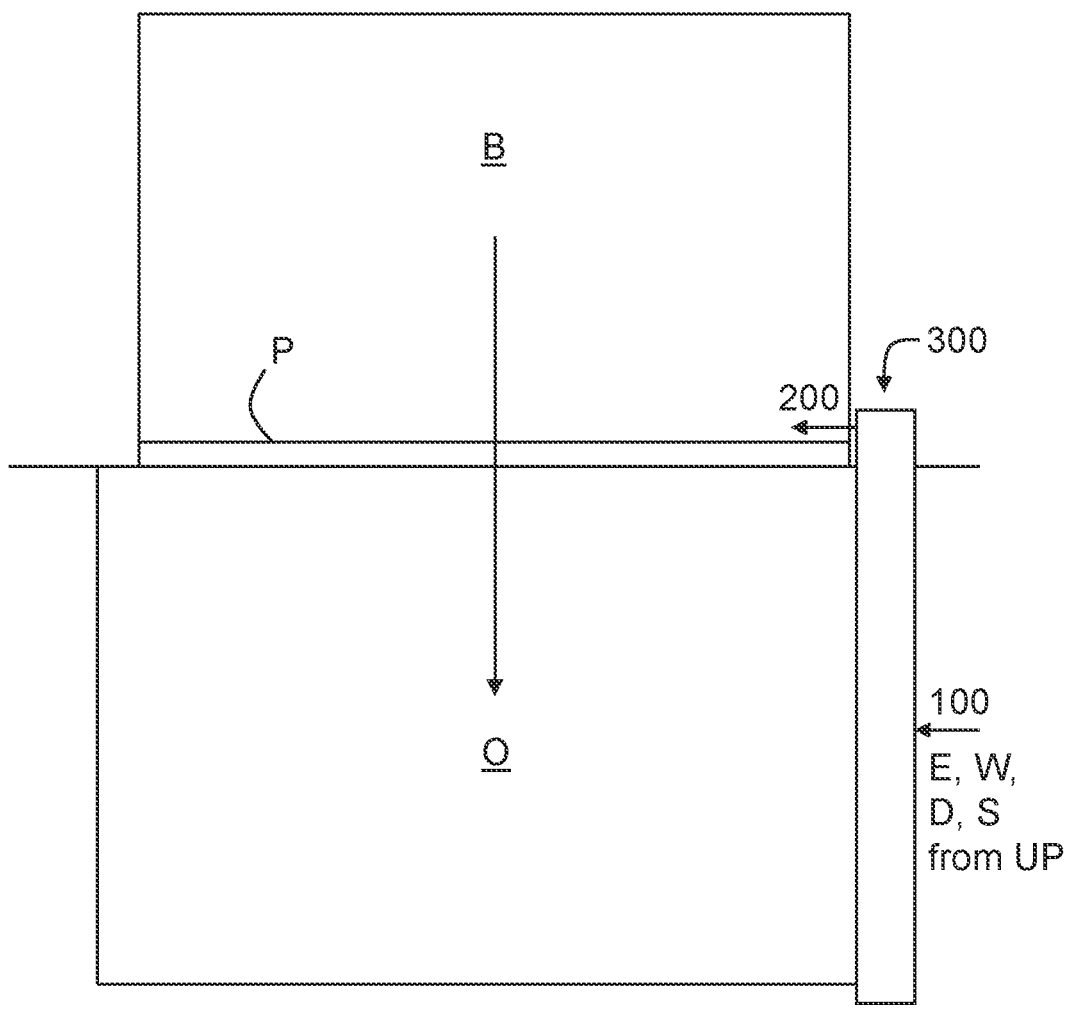
FIGS. 1-2 show block diagrams of a utilities connection management system according to exemplary embodiments hereof.
Figure 2:
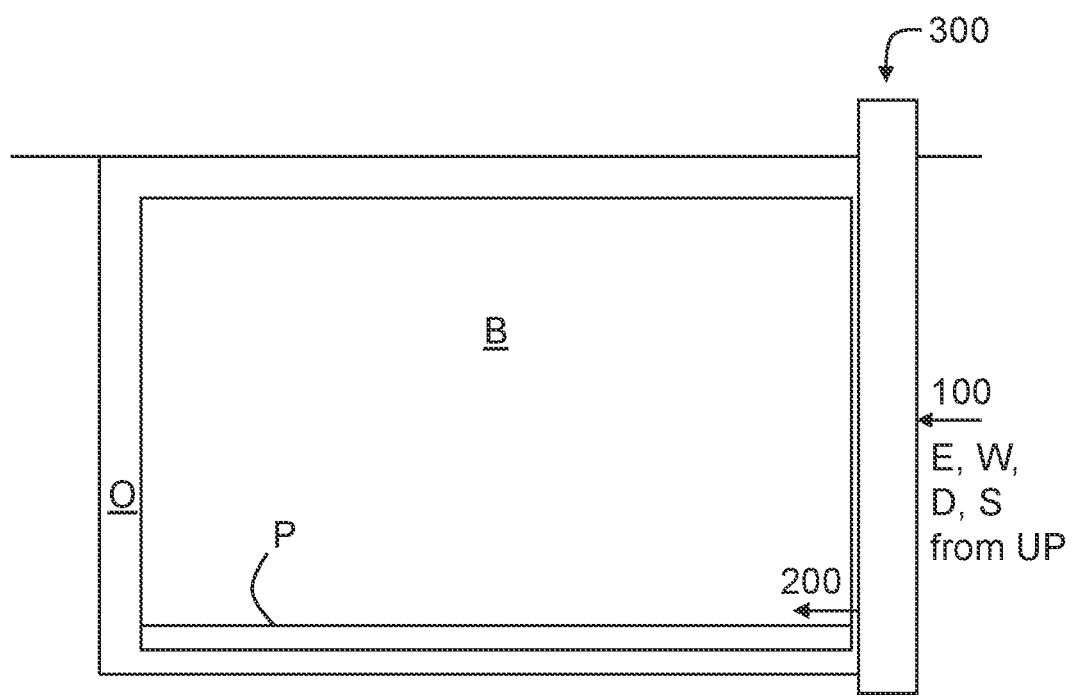

FIGS. 1-2 show generalized block diagrams of the system 10 configured with a building B on a building platform P with the building B and platform P movable into and out of a basement pit O. FIG. 1 shows the platform P in its upper position thereby positioning the building B generally above grade (e.g., at ground level), and FIG. 2 shows the platform P in its lower position thereby positioning the building B generally below grade (e.g., underground). As will be described herein, the system 10 secures, repositions, protects, and generally manages the building's various utility services, lines, and connections during the movement of the building from the ground level position to the underground position, and back. In particular, the system 10 provides a continuous and uninterrupted connection between the building B and the associated utility service providers UP during the translation of the building B. In this way, the utility service lines (e.g., from the electrical grid or water main) do not need to be severed or otherwise disconnected from the building B during translation of the building B.

In some embodiments, as shown in FIGS. 1-2, the utility lines extending from the utility providers UP, e.g., from the electrical grid, water main, Internet, telephone, etc., are received at the first interface 100 of the system 10. In addition, the private sewage lateral extending from the public sewer main to the building B also is connected to the system 10 at the first interface 100. Accordingly, the first interface 100 is preferably fixed in place so that the connections between the utility lines and the first interface 100 also are fixed.

In addition, in some embodiments, the system 10 provides the utility lines to the building B at the second interface 200 and receives the building's sewage output also at the second interface 200. Accordingly, the second interface 200 may be configured to translate with the building B as the building B and the platform P translate from above ground to underground and back.

that may generally translate from a predominantly above grade position to a predominantly below grade position, and back again, such as, without limitation, Given the above, the system 10 is arranged as an intermediate interface between the utility providers UP (including the sewage receivers) and the building B.

For the purposes of this specification, the term utilities will refer to the traditional utilities (e.g., electrical, water, Internet, telephone, etc.) and the sewage system. In addition, the term utility line will refer to the traditional utility lines (e.g., electrical, water, Internet, telephone, etc.) as well as the sewage line(s).

For the purposes of this specification, as shown in FIGS. 1-2, the system 10 will be described primarily with respect to managing the electrical utility line(s) E, the water line(s) W, the data lines (e.g., Internet, telephone, etc.) D, and the sewage lines S provided by utility providers UP. However, it is understood that the system 10 may be used with any types of utility lines and that the scope of the system 10 is not limited in any way by the types of utility lines that it may be used with.

In some embodiments, as shown in FIGS. 1-2, the system 10 includes a utilities management assembly 300 configured between the first interface 100 and the second interface 200. In general, the utilities management assembly 300 provides a continuous through-path for the utility lines between the first interface 100 and the second interface 200.

Figure 3:
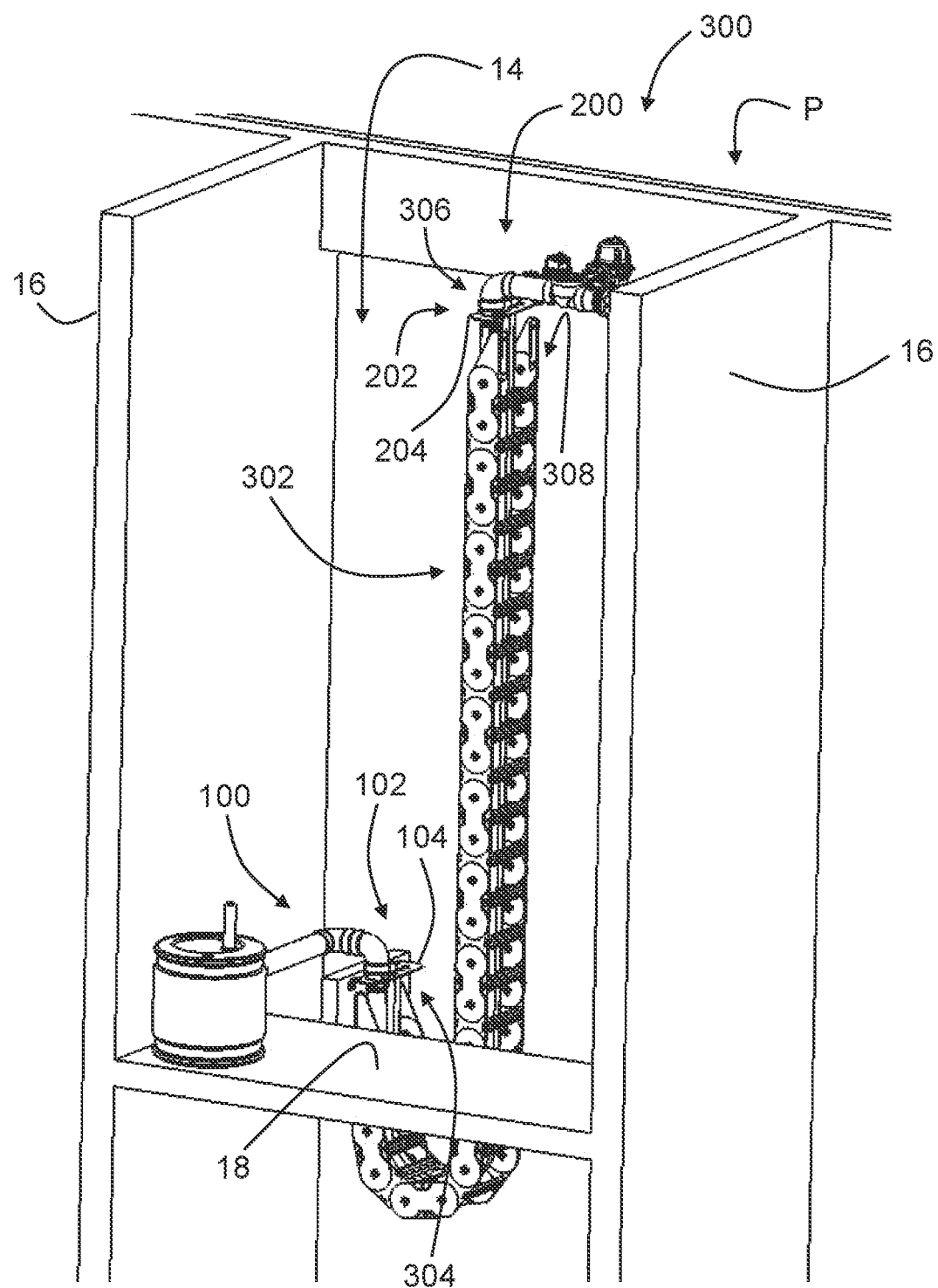
FIG. 3 shows aspects of a utilities connection management system according to exemplary embodiments hereof.

In some embodiments, as shown in FIG. 3, the utilities management assembly 300 includes a cable carrier 302 with a first end 304, a second end 306, and one or more flexible conduits 308 extending from the first end 304 to the second end 306. In some embodiments, the carrier's first end 304 is coupled to the first interface 100 and the carrier's second end 306 is coupled to the second interface 200. Accordingly, the carrier's first end 304 may be generally fixed in place while its second end 306 may translate with the building B and the platform P. In this way, the utility lines E, W, S, and D may be continually routed between the first and second interfaces 100, 200 during the translation of the platform P. The cable carrier 302 may comprise stainless steel, corrosion resistant plated steel, and/or any other type(s) of suitable materials.

In some embodiments, each flexible conduit 308 is configured with a flexible utility line segment 310 compatible with a corresponding utility line (e.g., electrical E, water W, data D, and sewage S lines). Each flexible line segment 310 preferably extends from the carrier's first end 304 to its second end 306 such that the first end 304 is in communication with the second end 306 for each type of utility line (e.g., electrical E, water W, data D, and sewage S). In this way, the cable carrier 302 may be configured between the first interface 100 and the second interface 200 for each of the utility lines as required.

For example, a first conduit 308 may include a first flexible utility line segment 310 compatible with the electric utility line(s) E, a second conduit 308 may include a utility line segment 310 compatible with the water line(s) W, a third conduit 308 may include a utility line segment 310 compatible with the data line(s) D, and a fourth conduit 308 may include a utility line segment 310 compatible with the sewer line(s) S. In this way, the cable carrier 302 provides flexible, continual, and uninterrupted cable management of each of the utility lines between the first and second interfaces 100, 200 during the translation of the building B. It is understood that the cable carrier 302 also may include additional conduits 308 to receive and contain other types of service lines and that the scope of the system 10 is not limited in any way by the number of conduits implemented.

Figure 4:
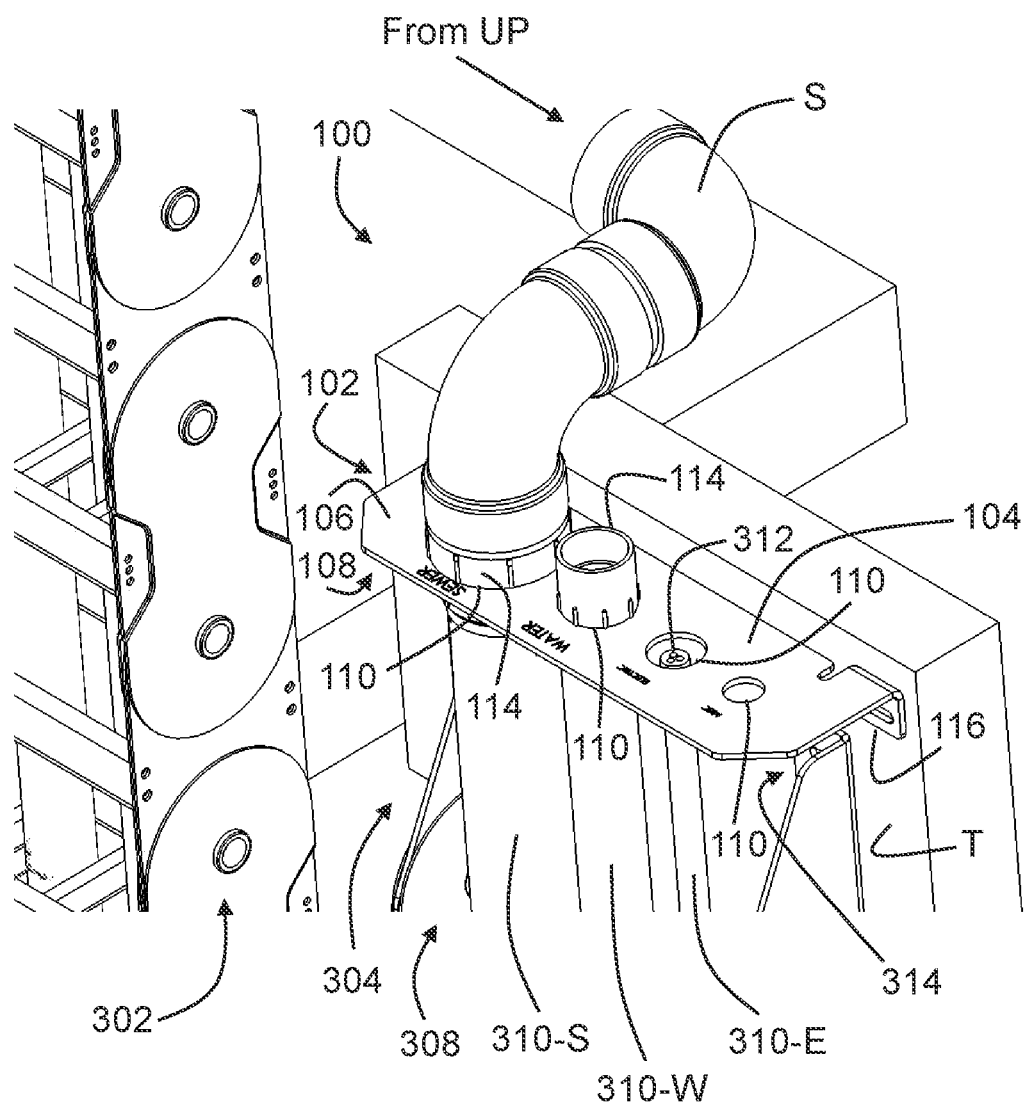
FIGS. 4-5 show aspects of a manifold bracket and a cable carrier according to exemplary embodiments hereof.

In some embodiments, as shown in FIG. 4, the first interface 100 includes a first manifold bracket 102. In some embodiments, the first end 304 of the cable carrier 302 is configured with the first manifold bracket 102.

In some embodiments, as shown in FIG. 4, the first manifold bracket 102 includes a mounting plate 104 with a first side 106 (e.g., a top side) and a second side 108 (e.g., an underneath side). The mounting plate 104 also includes one or more ports 110, e.g., openings or holes, that extend through the plate 104 from the first side 106 to the second side 108. In some embodiments, the first end 304 of the cable carrier 302 is configured with the mounting plate 104 with the ends of each of the flexible utility line segments 310 within the carrier's conduits 308 terminating at a corresponding port 110. For example, as shown in FIG. 4, the flexible utility line segment 310-E for the electrical lines E is shown with an end 312 terminating at its corresponding port 110.

In some embodiments, as shown in FIG. 4, the first interface 100 is configured to receive utility lines (e.g., electrical E, water W, data D, and sewage S) from the utility providers UP.

In some embodiments, as shown in FIG. 4, each port 110 is designed to couple an end of a flexible utility line segment 310 (an end that terminates at a port 110) with the corresponding utility lines E, W, D, S from the utility providers UP. For example, as shown in FIG. 4, the end of the sewage line S from the utility provider is coupled to the flexible utility line segment 310-S (for the sewage S) at its corresponding port 110. It is understood that other ports 110 may be similarly configured with the electrical E, water W, and data D utilities from the utility providers UP.

In some embodiments, the ports 110 provide connection(s) between the flexible utility line segments 310 and the utility lines E, W, D, S from the utility providers UP at the ports 110 via connection and strain relief mechanism 114, other types of cable connectors, other types of threaded unions, and/or any other suitable forms of connection and/or strain relief mechanisms.

In some embodiments, as shown in FIG. 4, the mounting plate 104 includes mounting mechanisms 116 (e.g., mounting feet or tabs) that are used to attach the mounting plate 104 to a support structure T. The mounting mechanisms 116 may include through-holes that may receive bolts or screws to secure the mounting mechanisms 116 to the structure T. Other attachment techniques, such as welding, adhesive, and/or other techniques also may be used. In some embodiments, the support structure T may include a surface of an element of the building's foundation F such as a sidewall 16 of the compartment 14 (see FIG. 10). It is understood that any suitable support structure T may be utilized.

In some embodiments, as shown in FIG. 4, the mounting plate 104 is separate from the first end 304 of the cable carrier 302, and the cable carrier 302 also is attached to a support structure T (the same or different support structure T as used to secure the mounting plate 104). In this case, the carrier's first end 304 may include its own mounting mechanism 314 (e.g., mounting feet or tabs utilizing screws, bolts, and/or other attachment methods) that may be attached to the structure T.

Figure 5:
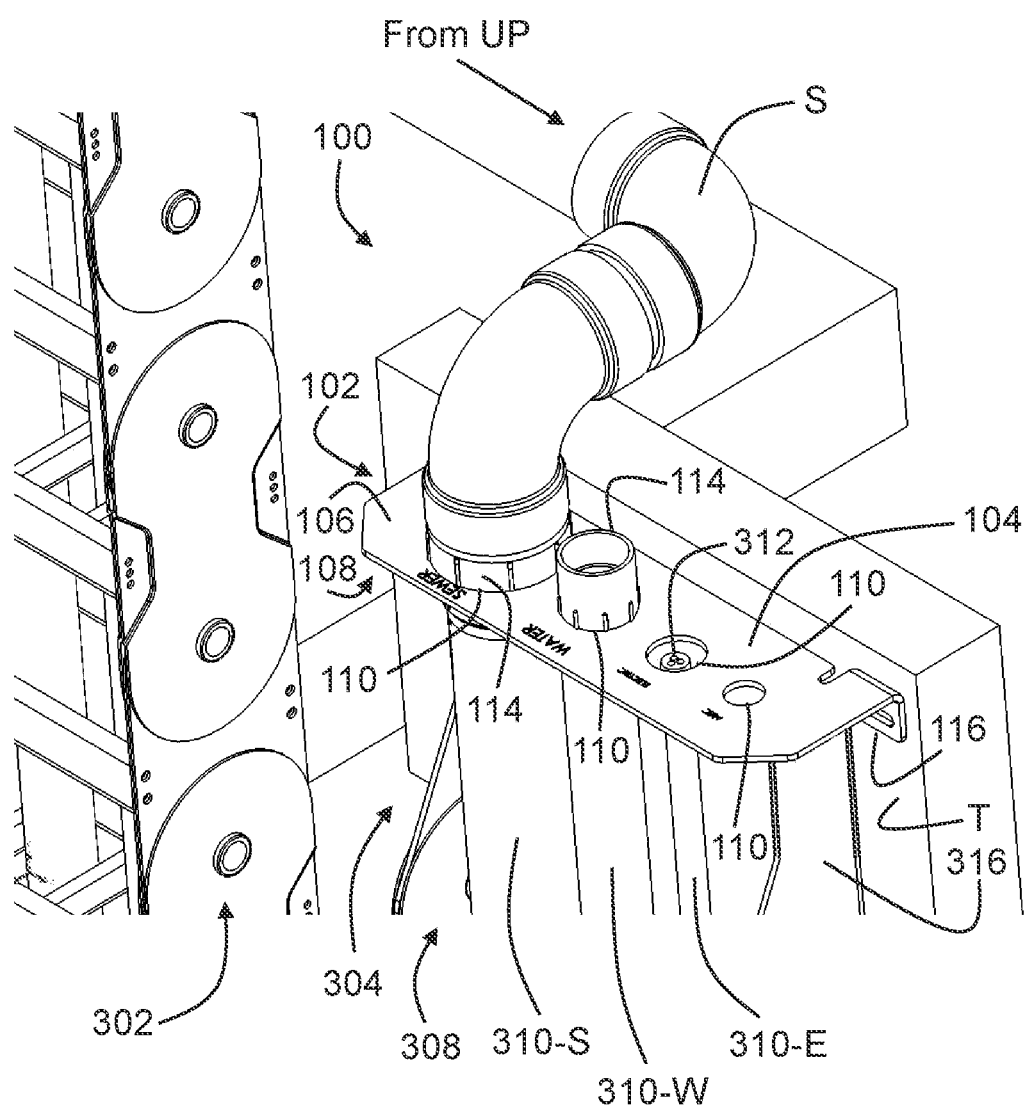

In other embodiments, as shown in FIG. 5, the first end 304 of the cable carrier 302 is integrated with the mounting plate 104. In this case, attachment of the mounting plate 104 to the support structure T effectively mounts the first end 304 of the cable carrier 302 to the support structure T as well. As shown in FIG. 5, the carrier's first end 304 may include integrated structures 316 (e.g., side walls or plates) that extend from the body of the cable carrier 302 to the mounting plate 104 and that are attached thereto (e.g., to the underside 108 of the plate 104). In some embodiments, the mounting plate 104 itself includes structures that extend downwards and that are incorporated into the cable carrier 302. For example, the top surface 106 of the mounting plate 104 may bend downward at its left, right, front, and/or back edges, with the downward extending sections integrated directly into structural elements of the cable carrier 302.

Figure 6:
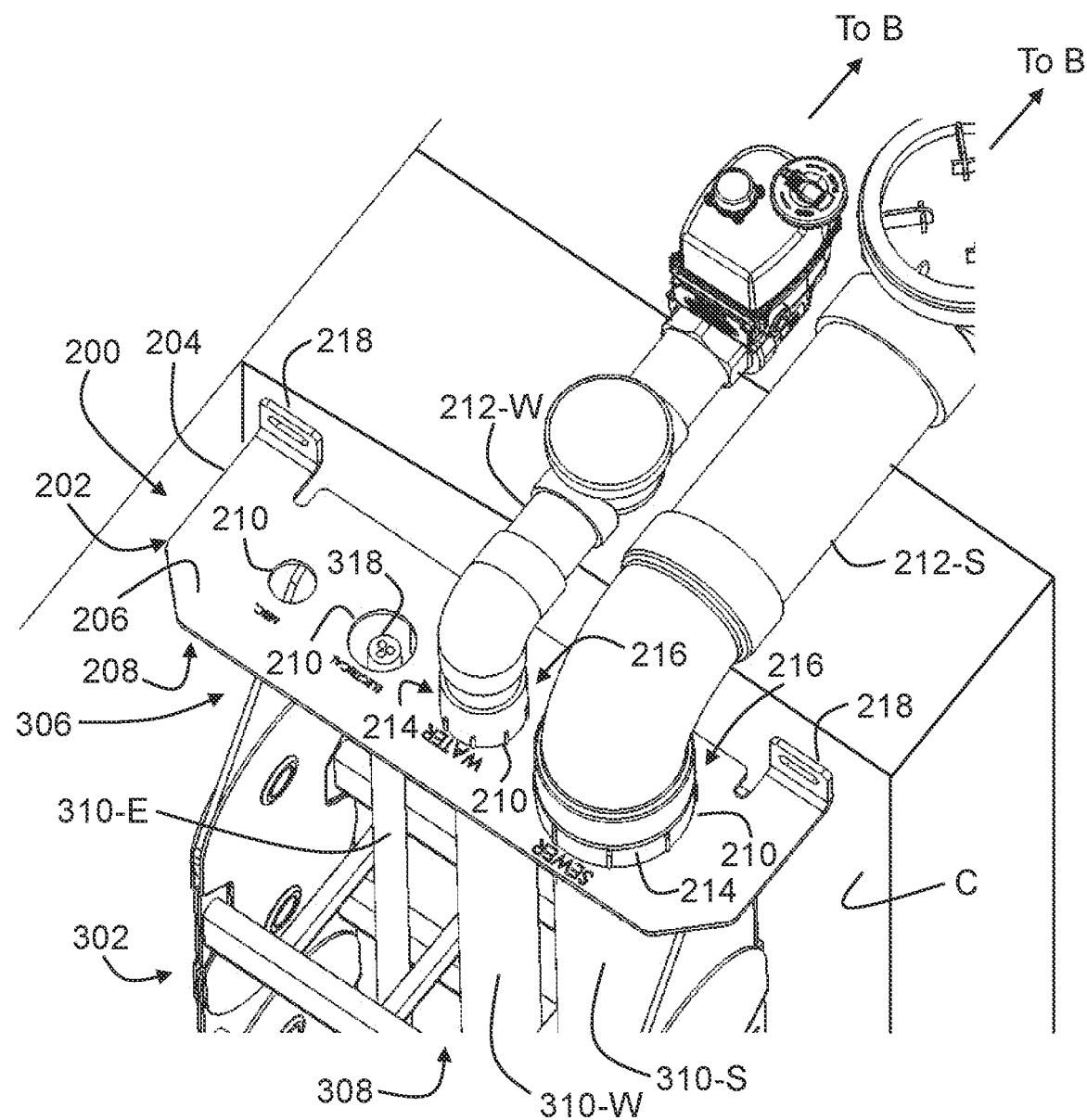
FIGS. 6-8 show aspects of a manifold bracket and a cable carrier according to exemplary embodiments hereof.

In some embodiments, as shown in FIG. 6, the second interface 200 includes a second manifold bracket 202. In some embodiments, the second end 306 of the cable carrier 302 is configured with the second manifold bracket 202.

In some embodiments, as shown in FIG. 6, the second manifold bracket 202 includes a mounting plate 204 with a first side 206 (e.g., a top side) and a second side 208 (e.g., an underneath side). The mounting plate 204 also includes one or more ports 210, e.g., openings or holes, that extend through the plate 204 from the first side 206 to the second side 208. In some embodiments, the second end 306 of the cable carrier 302 is configured with the mounting plate 104 with the ends of each of the flexible utility line segments 310 within the carrier's conduits 308 terminating at a corresponding port 210. For example, as shown in FIG. 5, the flexible utility line segment 310-E for the electrical lines E is shown with an end 318 terminating at its corresponding port 210.

In some embodiments, as shown in FIG. 6, the second interface 200 includes utility sections 212 that each extend from a corresponding port 210 on the second manifold bracket 202 to the building B. In this way, each utility section 212 connects a corresponding utility (e.g., electrical E, water W, data D, and sewage S) from the second manifold bracket 202 to the building B. For example, as shown in FIG. 6, a first utility section 212-W configured to provide a water W utility includes a first end 214 coupled to a corresponding port 210 on the bracket 202 and a second end that extends into the building B. In another example, as shown in FIG. 6, a second utility section 212-S configured to receive sewage includes a first end 214 coupled to a corresponding port 210 on the bracket 202 and a second end that extends into the building B. While not shown, it is understood that the second interface 200 may include similar utility sections 212 configured with corresponding ports 210 for the electrical E utility, for the data D utility, and for other desired utilities.

In some embodiments, as shown in FIG. 6, each port 210 is designed to couple an end of a flexible utility line segment 310 (an end that terminates at a port 210) with the first end 214 of its corresponding utility section 212. For example, the end of the flexible utility line segment 310-W (for the water W) is coupled to the first end 214 of the corresponding utility section 212-W at its corresponding port 210. In another example, the end of the flexible utility line segment 310-S(for the sewage S) is coupled to the first end 214 of the corresponding utility section 212-S at its corresponding port 210. It is understood that other ports 210 may be similarly configured for the electrical E and data D utilities.

In some embodiments, the ports 210 provide connection(s) between the flexible utility line segments 310 and the utility sections 212 at the ports 210 via connection and strain relief mechanism 216, other types of cable connectors, other types of threaded unions, and/or any other suitable forms of connection and/or strain relief mechanisms.

In some embodiments, as shown in FIG. 6, the mounting plate 204 includes mounting mechanisms 218 (e.g., mounting feet or tabs) that are used to attach the mounting plate 204 to a support structure C. The mounting mechanisms 218 may include through-holes that may receive bolts or screws to secure the mounting mechanisms 218 to the structure C. Other attachment techniques, such as welding, adhesive, and/or other techniques also may be used. In some embodiments, the support structure C may include a surface of an element of the building B and/or of the platform P. For example, the support structure C may include a sidewall of the building B and/or a side structure integrated with the platform P. It is understood that any suitable support structure C may be utilized.

Figure 7:
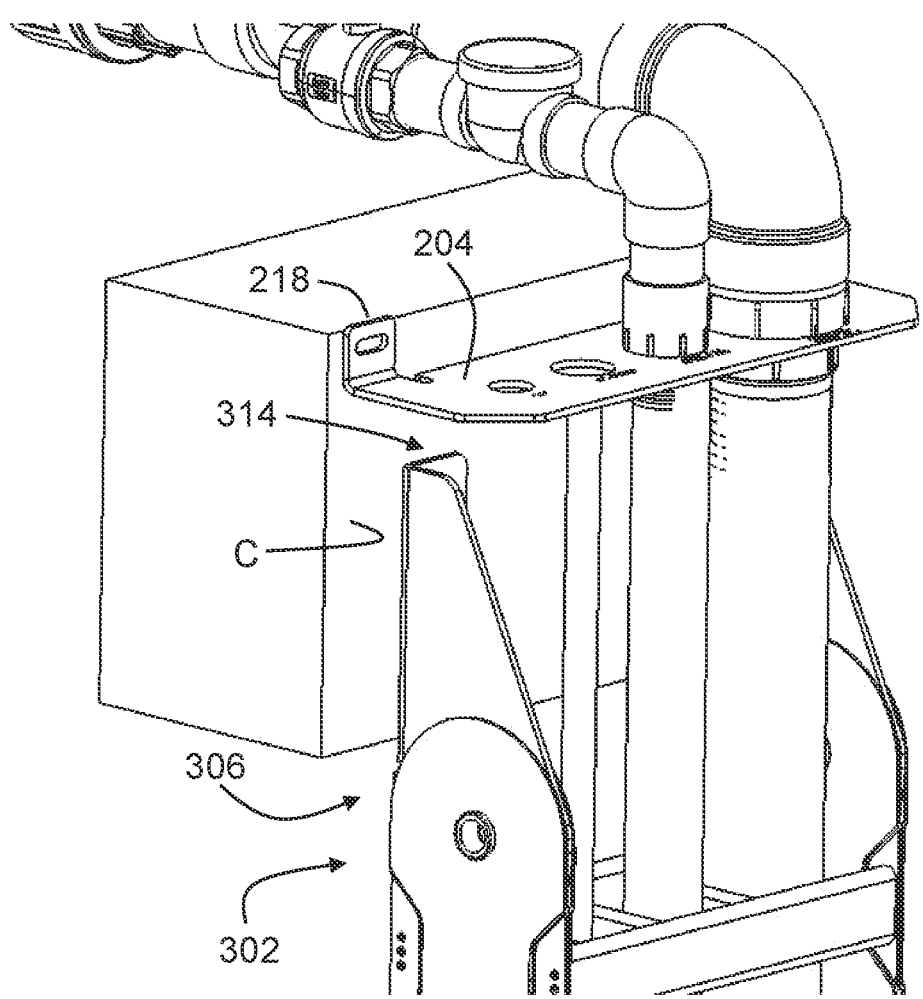

In some embodiments, as shown in FIG. 7, the mounting plate 204 is separate from the second end 306 of the cable carrier 302, and the cable carrier 302 also is attached to a support structure C (the same or different support structure C as used to secure the mounting plate 204). In this case, the carrier's second end 306 may include its own mounting mechanism 314 (e.g., mounting feet or tabs utilizing screws, bolts, and/or other attachment methods) that may be attached to the structure C.

Figure 8:
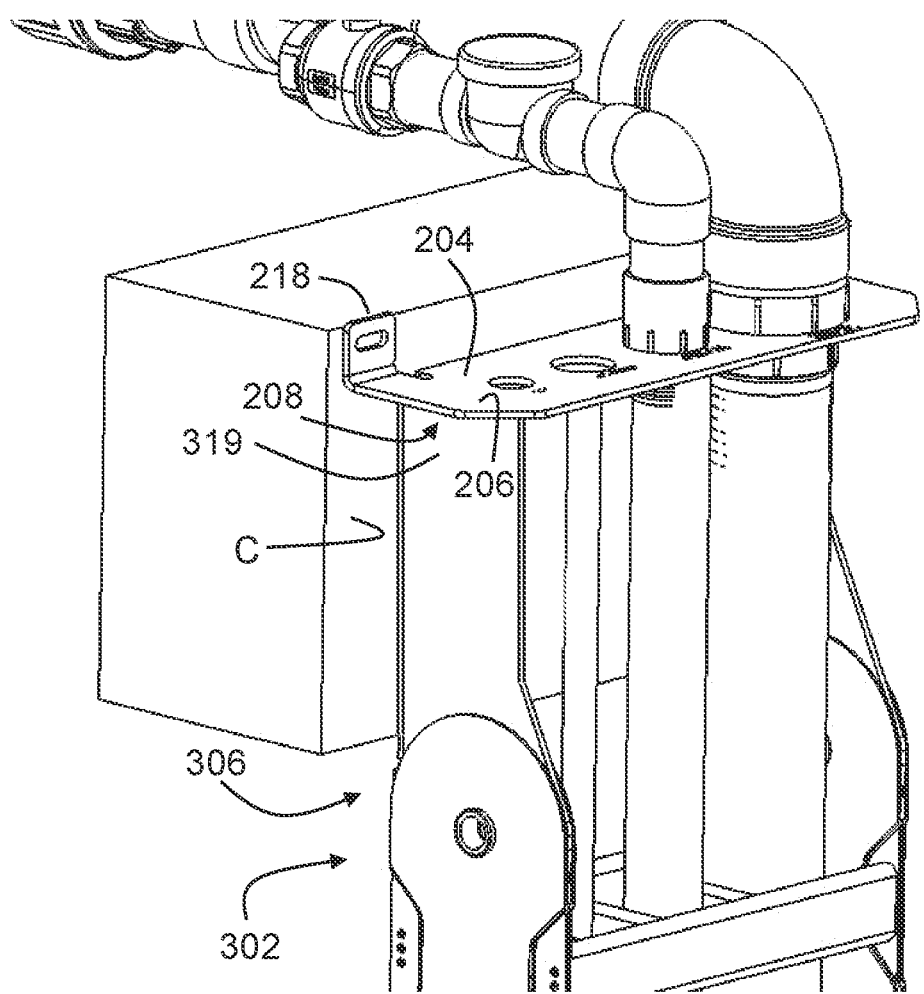

In other embodiments, as shown in FIG. 8, the second end 306 of the cable carrier 302 is integrated with the mounting plate 204. In this case, attachment of the mounting plate 204 to the support structure C effectively mounts the second end 306 of the cable carrier 302 to the support structure C as well. As shown in FIG. 8, the carrier's second end 306 may include integrated structures 319 (e.g., side walls or plates) that extend from the body of the cable carrier 302 to the mounting plate 204 and that are attached thereto (e.g., to the underside 208 of the plate 204). In some embodiments, the mounting plate 204 itself includes structures that extend downwards and that are incorporated into the cable carrier 302. For example, the top surface 206 of the mounting plate 204 may bend downward at its left, right, front, and/or back edges, with the downward extending sections integrated directly into structural elements of the cable carrier 302.

Figure 9:
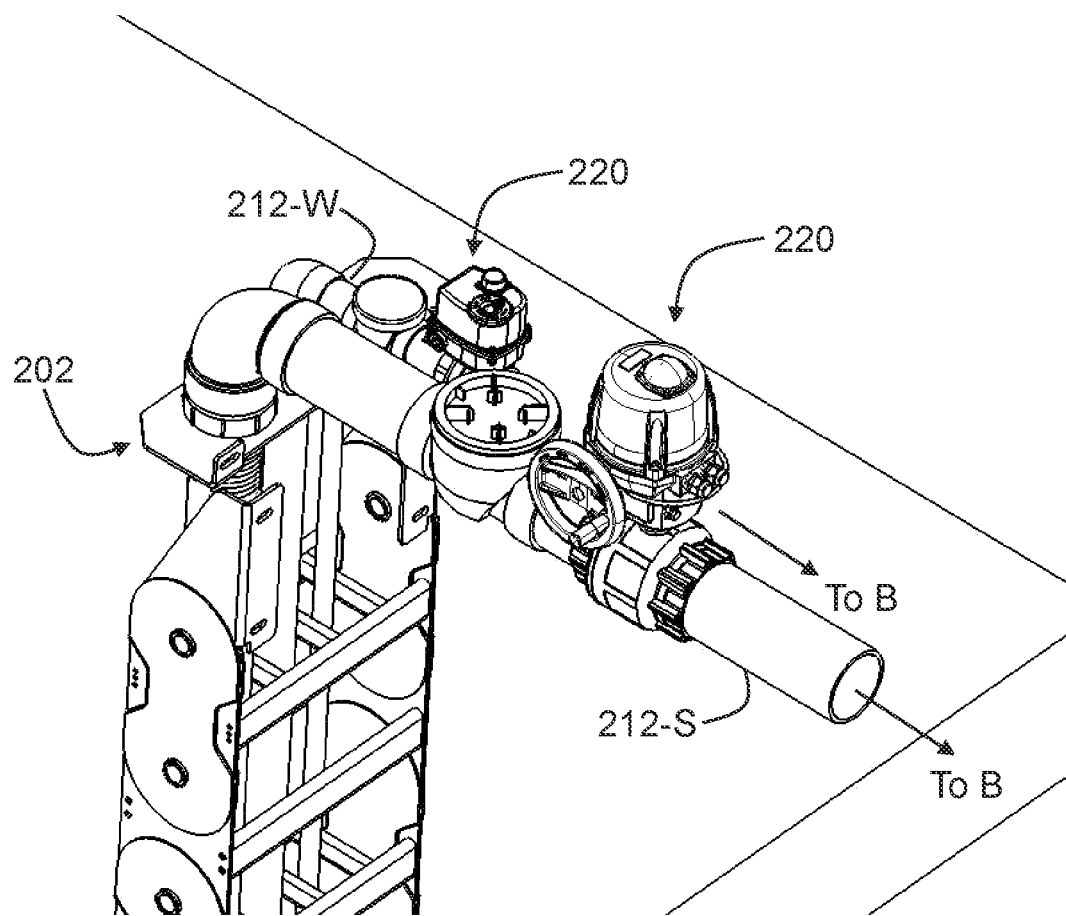
FIG. 9 shows aspects of a manifold bracket, a cable carrier, and utility sections according to exemplary embodiments hereof.

In some embodiments, as shown in FIG. 9, the utility section 212-W and/or the utility section 212-S each include a valve 220 (e.g., a check valve) configured between the second manifold bracket 202 (e.g., the second manifold plate 204) and the building B. In some embodiments, the valves 220 are electrically controlled and may be automatically actuated when the building B is triggered to translate from an above ground position to a below ground position. In this way, the valves 220 provide a redundancy and may shut to disconnect the building B from the utilities to prevent any backflow of sewage and potable water back into the building B.

In some embodiments, as shown in FIGS. 10-13, the system 10 is configured with a building resting on a platform P with the building and platform P movable into and out of a pit O. In some embodiments, the pit O is formed at least in part by a building foundation 12. In some embodiments, the foundation 12 includes (or is configured with) a compartment 14 defined by sidewalls 16. The compartment 14 is open on a side facing into the pit O and is thereby accessible on this side. In some embodiments, the compartment 14 generally extends from the top of the pit O where the platform P is generally located when in its upper position to the bottom of the pit O where the platform P is generally located when in its lower position. In some embodiments, the system 10 is configured, at least partially, within the compartment 14. In this way, the system 10 may access the platform P and the building from within the compartment 14. Also see FIG. 3.

Figure 10:
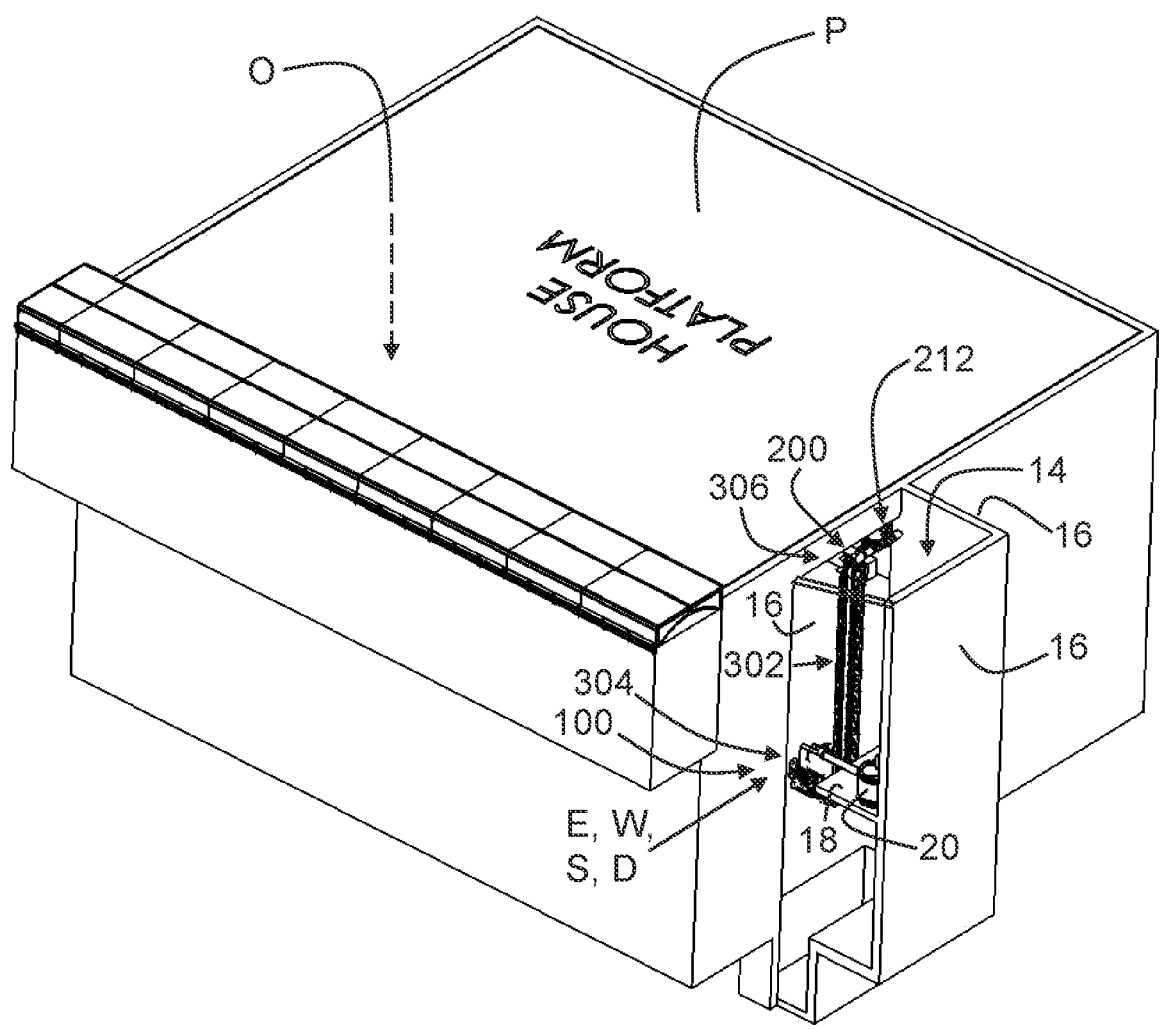
FIGS. 10-13 shows aspects of a utilities connection management system according to exemplary embodiments hereof.
Figure 11:
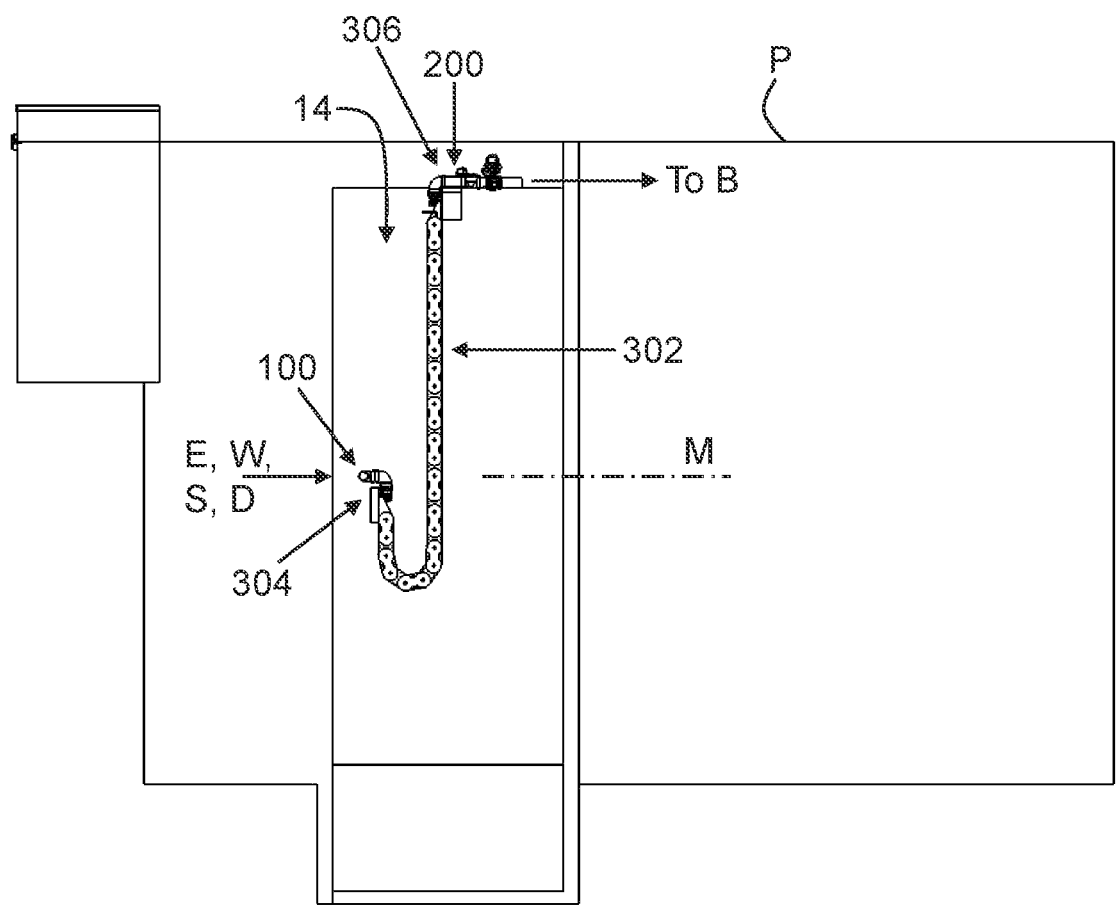
Figure 12:
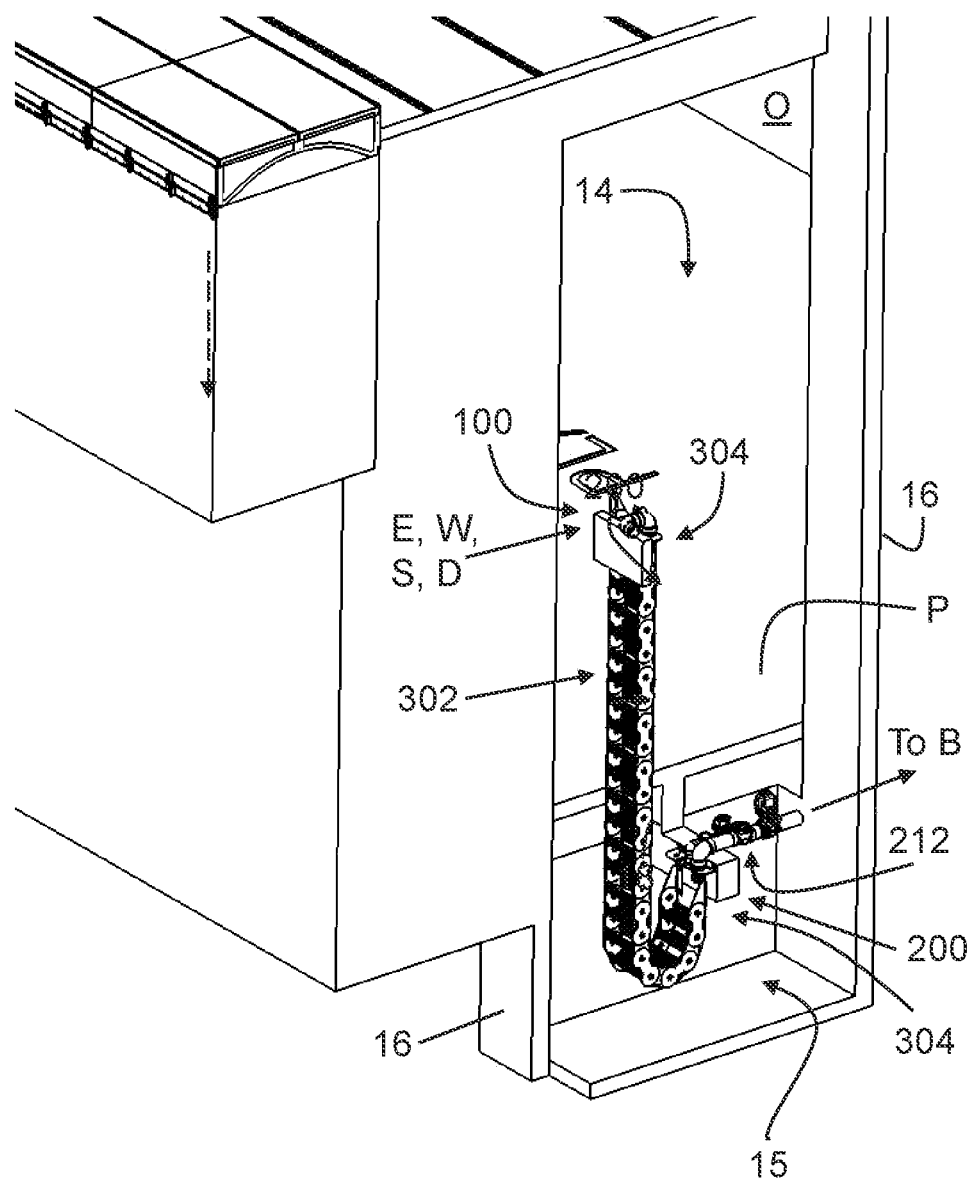
Figure 13:
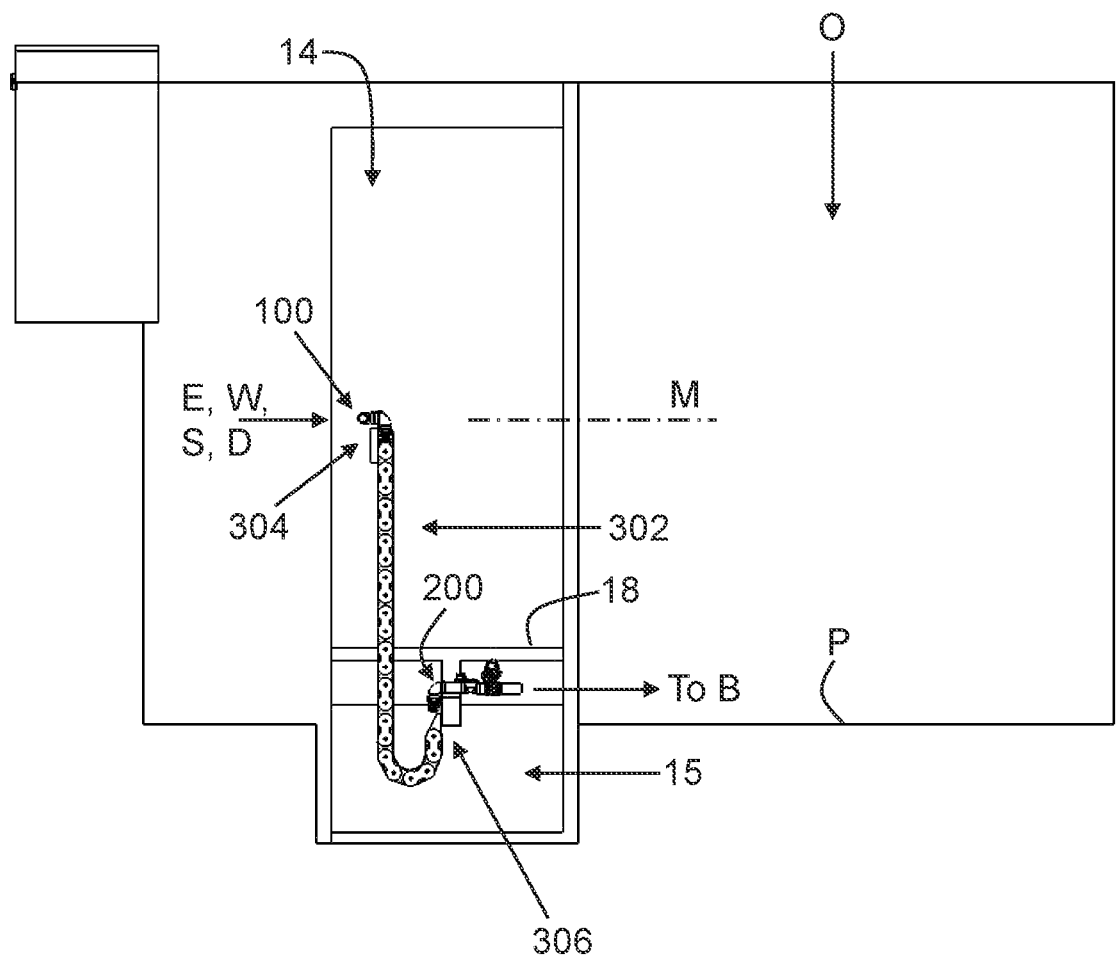

FIG. 10 shows a schematic of the platform P in its upper position and FIG. 11 shows a side view of the same. FIG. 12 shows a schematic of the platform P in its lower position and FIG. 13 shows a side view of the same. The building has been omitted from these views for clarity.

In some embodiments, the cable carrier 302 is configured within the compartment 14 with its first end 304 attached to a fixed structure within the compartment 14, e.g., to an inner surface of the compartment's sidewall 16. Note that the compartment sidewall 16 to which the first end 304 is configured in FIG. 10 is shown as transparent in order to provide a view to the elements of the system 10 located within the compartment 14.

As mentioned in other sections, the first interface 100 may be integrated with a sidewall 16 of the compartment 14. In some embodiments, the utility lines E, W, S, D from the utility providers UP may terminate at and/or pass through the sidewall 16 and be configured with the first manifold bracket 102 as described herein.

In some embodiments, as shown in FIGS. 11 and 13, the first interface 100 and the cable carrier's first end 304 are preferably located about halfway between the top and bottom of the compartment 14 as denoted by the dashed line M. In this way, the cable carrier 302 may extend upward from its first end 304 to its second end 306 when the platform P is in its upper position (see FIG. 11), and downward from its first end 304 to its second end 306 when the platform P is in its lower position (see FIG. 13). Having the cable carrier's first end 304 located in this position allows for the length of the cable carrier 302 to be optimized in that it may extend generally equal distances upward and downward when the platform P is in its upper and lower positions, respectively. In some embodiment, as shown in FIG. 13, the compartment 14 may include a lower portion 15 below the general bottom of the opening O and below the platform P when the platform P is in its lower position to provide additional room for the lower turn of the cable carrier 302 at its second end 306 when in this arrangement.

In some embodiments, as shown in FIG. 10, the compartment 14 includes an inner shelf 18 (or ledge, etc.) located next to or otherwise generally adjacent to the first interface 100. The shelf 18 is fixed within the compartment 14 and preferably does not move during the translation of the building B.

In some embodiments, the system 10 includes a sewage pump 20 (e.g., a sewage basin and a grinder pump) positioned on the shelf 18 and configured with the sewage line S. If the sewer service to the building B is above the first end 304 of the cable carrier 302, a cistern pump system or ejector pit may be used, especially during the lowering of the building B in order to evacuate as much waste as possible to prevent backflow into the building B during the movement.

In some embodiments, the system 10 may include multiple cable carriers 302 each configured with at least some of the elements as described herein.

It is understood that any aspects of any embodiment(s) of the system 10 described herein or otherwise may be combined with any other aspects of any other embodiments to form additional embodiments of the system 10 all of which are within the scope of the system 10.

Those of ordinary skill in the art will appreciate and understand, upon reading this description, that embodiments hereof may provide different and/or other advantages, and that not all embodiments or implementations need have all advantages.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

The invention claimed is:

1. A cable management system for providing uninterrupted utility line connectivity between at least one utility provider and a retractable building as the retractable building translates from a first position primarily above ground to a second position primarily below ground, the cable management system comprising:
   a cable carrier including a first end, a second end and at least one conduit extending between the first end and the second end;
   at least one utility line section configured within the at least one conduit and extending from the cable carrier first end to the cable carrier second end;
   a first manifold plate including a first plate upper surface oriented horizontally and positioned above the cable carrier first end and including at least one first port passing through the first plate upper surface and adapted to connect a first end of the at least one utility line section to an end of at least one first utility line extending from the at least one utility provider, the first manifold plate including a first mounting tab extending substantially orthogonal to the first plate upper surface and coupled to a vertical surface of a first support structure; and
   a second manifold plate including a second plate upper surface oriented horizontally and positioned above the cable carrier second end and including at least one second port passing through the second plate upper surface and adapted to connect a second end of the at least one utility line section to an end of at least one second utility line extending from the retractable building, the second manifold plate including a second mounting tab extending substantially orthogonal to the second plate upper surface and coupled to a vertical surface of a second support structure, the second support structure coupled to the building;
   wherein the first manifold plate and the first support structure are fixed and do not move in accordance with a translation of the building; and
   wherein the second manifold plate and the second support structure move in accordance with the translation of the building.

2. The cable management system of claim 1 wherein the cable carrier first end is coupled to the first manifold plate.

3. The cable management system of claim 1 wherein the cable carrier second end is coupled to the second manifold plate.

4. The cable management system of claim 1 wherein when the retractable building is in the second position, the retractable building is located within an underground pit, the cable management system further comprising:
   a compartment adjacent the underground pit and including a compartment inner volume, the compartment inner volume accessible from the underground pit.

5. The cable management system of claim 4 wherein the underground pit incudes a pit top and a pit bottom, and the compartment extends from the pit top to the pit bottom.

6. The cable management system of claim 5 wherein the compartment inner volume is accessible from the underground pit from the pit top to the pit bottom.

7. The cable management system of claim 5 wherein the first manifold plate is connected to the first support structure at a location about halfway between the pit top and the pit bottom.

8. The cable management system of claim 7 wherein a length of the cable carrier is equal or greater than a distance between the pit top and the pit bottom.

9. The cable management system of claim 1 further comprising a sewage pump located adjacent the cable carrier first end.

10. The cable management system of claim 9 further comprising a shelf located within the compartment about halfway between the pit top and the pit bottom, and the sewage pump is configured with the shelf.

11. The cable management system of claim 4 wherein the underground pit includes a foundation, and the compartment is formed as part of the foundation.

12. The cable management system of claim 1 wherein the cable carrier first end is not coupled to the first manifold plate.

13. The cable management system of claim 1 wherein the cable carrier second end is not coupled to the second manifold plate.

14. A cable management system for providing uninterrupted utility line connectivity between at least one utility provider and a retractable building as the retractable building translates from a first position primarily above ground to a second position primarily below ground, the cable management system comprising:

a cable carrier including a first end, a second end and at least one conduit extending between the first end and the second end;

at least one utility line section configured within the at least one conduit and extending from the cable carrier first end to the cable carrier second end;

a first manifold bracket configured with the cable carrier first end and including at least one first port adapted to connect a first end of the at least one utility line section to an end of at least one first utility line extending from the at least one utility provider;

a second manifold bracket configured with the cable carrier second end and including at least one second port adapted to connect a second end of the at least one utility line section to an end of at least one second utility line extending from the retractable building; and a sewage pump located adjacent the cable carrier first end;

wherein the cable carrier first end is fixed and does not move in accordance with a translation of the building;

wherein the cable carrier second end is attached to a support structure associated with the building such that the cable carrier second end moves in accordance with the translation of the building.

15. The cable management system of claim 14 wherein the cable carrier first end is coupled to the first manifold plate.

16. The cable management system of claim 14 wherein the cable carrier second end is coupled to the second manifold plate.

17. The cable management system of claim 14 wherein the cable carrier first end is not coupled to the first manifold plate.

18. The cable management system of claim 14 wherein the cable carrier second end is not coupled to the second manifold plate.

\* \* \* \* \*